United States Patent
Dumm et al.

(10) Patent No.: US 9,095,914 B2
(45) Date of Patent: Aug. 4, 2015

(54) PRECISION WIRE SAW INCLUDING SURFACE MODIFIED DIAMOND

(75) Inventors: Timothy Dumm, Westerville, OH (US); Kan-yin Ng, Columbus, OH (US)

(73) Assignee: DIAMOND INNNOVATIONS INC, Worthington, OH (US)

( * ) Notice: Subject to any disclaimer, the term of this patent is extended or adjusted under 35 U.S.C. 154(b) by 833 days.

(21) Appl. No.: 14/123,568

(22) PCT Filed: Aug. 2, 2010

(86) PCT No.: PCT/US2010/044148
§ 371 (c)(1),
(2), (4) Date: Dec. 3, 2013

(87) PCT Pub. No.: WO2011/014884
PCT Pub. Date: Feb. 3, 2011

(65) Prior Publication Data
US 2014/0165804 A1   Jun. 19, 2014

Related U.S. Application Data

(60) Provisional application No. 61/230,125, filed on Jul. 31, 2009.

(51) Int. Cl.
*B23D 61/18* (2006.01)
*B23D 65/00* (2006.01)
*B28D 5/04* (2006.01)

(52) U.S. Cl.
CPC .............. *B23D 61/185* (2013.01); *B23D 65/00* (2013.01); *B28D 5/045* (2013.01); *Y10T 83/0414* (2015.04); *Y10T 83/9292* (2015.04); *Y10T 428/292* (2015.01)

(58) Field of Classification Search
CPC ........ B23D 61/185; B28D 1/08; B28D 5/045; B28D 11/24; B28D 1/088
USPC ........ 125/21, 16.01, 16.02; 51/307, 309, 298; 451/168, 296
See application file for complete search history.

(56) References Cited

U.S. PATENT DOCUMENTS

| 3,762,882 A | 10/1973 | Grutza |
| 3,919,717 A | 11/1975 | Cullen et al. |
| 3,936,577 A | 2/1976 | Christini et al. |
| 3,955,324 A | 5/1976 | Lindstrom |

(Continued)

FOREIGN PATENT DOCUMENTS

| EP | 0212879 B1 | 11/1989 |
| GB | 2038214 | 7/1980 |

(Continued)

OTHER PUBLICATIONS

Sonin et al., The action of iron particles at catalyzed hydrogenation of {100} and {110} faces of synthetic diamond, Diamond and Related Materials, vol. 12 (2003) 1559-1562, Elsevier.

(Continued)

*Primary Examiner* — George Nguyen
(74) *Attorney, Agent, or Firm* — Corinne R. Gorski (57) ABSTRACT

A wire having a surface and diamond particles bonded to said surface by a bond matrix, wherein each diamond particle has surface roughness of about 0.60 to about 0.80 and a sphericity of about 0.25 to about 0.50.

21 Claims, 6 Drawing Sheets

(56) References Cited

U.S. PATENT DOCUMENTS

| | | | |
|---|---|---|---|
| 4,036,937 | A | 7/1977 | Roy et al. |
| 4,122,636 | A | 10/1978 | Roy et al. |
| 4,328,266 | A | 5/1982 | Feldstein |
| 4,358,923 | A | 11/1982 | Feldstein |
| 4,547,407 | A | 10/1985 | Spencer, Jr. |
| 4,681,817 | A | 7/1987 | Shinada |
| 4,805,586 | A | 2/1989 | Borse |
| 4,919,974 | A | 4/1990 | McCune et al. |
| 4,951,953 | A | 8/1990 | Kim |
| 4,997,686 | A | 3/1991 | Feldstein et al. |
| 5,035,771 | A | 7/1991 | Borse |
| 5,096,465 | A | 3/1992 | Chen et al. |
| 5,145,517 | A | 9/1992 | Feldstein et al. |
| 5,472,787 | A | 12/1995 | Johnson et al. |
| 5,482,637 | A | 1/1996 | Rao et al. |
| 5,547,716 | A | 8/1996 | Thaler |
| 5,597,625 | A | 1/1997 | Ong et al. |
| 5,695,387 | A | 12/1997 | Moravec et al. |
| 5,891,523 | A | 4/1999 | Feldstein |
| 6,070,570 | A * | 6/2000 | Ueoka et al. ............ 125/22 |
| 6,102,024 | A * | 8/2000 | Buljan et al. ............ 125/21 |
| 6,138,779 | A | 10/2000 | Boyce |
| 6,194,068 | B1 * | 2/2001 | Ohashi et al. ............ 428/379 |
| 6,254,461 | B1 | 7/2001 | Benning et al. |
| 6,280,489 | B1 | 8/2001 | Horie et al. |
| 6,306,466 | B1 | 10/2001 | Feldstein et al. |
| 6,357,433 | B1 * | 3/2002 | Whalin ............ 125/16.01 |
| 6,372,002 | B1 | 4/2002 | D'Evelyn et al. |
| 6,404,207 | B1 | 6/2002 | Bhushan |
| 6,500,488 | B1 | 12/2002 | Chang et al. |
| 6,503,642 | B1 | 1/2003 | Linde |
| 6,515,254 | B2 | 2/2003 | Beck et al. |
| 6,565,618 | B1 | 5/2003 | Ishizuka |
| 6,915,796 | B2 * | 7/2005 | Sung ............ 125/21 |
| 7,134,868 | B2 | 11/2006 | Babin et al. |
| 7,377,477 | B2 | 5/2008 | Lucek et al. |
| 7,556,558 | B2 | 7/2009 | Palmgren |
| 7,562,858 | B2 | 7/2009 | Dumm et al. |
| 8,118,898 | B2 | 2/2012 | Wakamiya |
| 2001/0033804 | A1 | 10/2001 | An |
| 2004/0112867 | A1 | 6/2004 | Horie et al. |
| 2004/0162014 | A1 | 8/2004 | John |
| 2006/0040126 | A1 | 2/2006 | Richardson et al. |
| 2006/0246275 | A1 | 11/2006 | Dumm et al. |
| 2009/0064983 | A1 | 3/2009 | Sudarshan |
| 2009/0120422 | A1 * | 5/2009 | Taniguchi ............ 125/21 |
| 2010/0064593 | A1 * | 3/2010 | Dumm et al. ............ 51/306 |
| 2010/0068524 | A1 * | 3/2010 | Dumm et al. ............ 428/403 |
| 2012/0100366 | A1 * | 4/2012 | Dumm et al. ............ 428/335 |

FOREIGN PATENT DOCUMENTS

| | | |
|---|---|---|
| JP | A-59059352 | 9/1982 |
| JP | S-62213965 | 9/1987 |
| JP | A-2118080 | 10/1988 |
| JP | 2003175406 | 6/2003 |
| JP | 2009-090441 | 4/2009 |
| TW | 200831407 A | 4/2008 |
| WO | 9502078 | 1/1995 |
| WO | 9706339 | 2/1997 |
| WO | 9928084 | 10/1999 |
| WO | 0060137 | 12/2000 |
| WO | 02062530 A1 | 8/2002 |
| WO | 2005011914 A2 | 2/2005 |
| ZA | 20020522 | 4/2003 |

OTHER PUBLICATIONS

Sonin, Interaction of Fine Fe Particles with Structural Defects on {111} Faces of Synthetic Diamond Crystals in a Hydrogen Atmosphere, Inorganic Materials, vol. 40, No. 1, 2004, pp. 20-22.

Chepurov. The channeling action of iron particles in the catalyzed hydrogenation of synthetic diamond. Diamond and Related Materials, vol. 9, (2000), pp. 1435-1438.

Evans, T. et al. Etching of Diamond Surfaces with Gases. Philosophical Magazine, vol. 6. 1961, pp. 429-440.

Mennig, G. Wear in Plastics Processing, Chapter 2. Metals and Wear Resistant Hardfacings; p. 171, Hanser Publilshers, New York, NY, 1990.

Apachitei, I, et al. Electroless Ni-P Composite Coatings: The Effect of Heat Treatment on the Microhardness of Substrate and Coating, Scripts Materials, vol. 38, No. 9, pp. 1347-1353, Elsevier Sciences,Ltd. 1958.

Feldstein, et al. Composite Electroless Nickel Coating for the Gear Industry, Gear Technology, The Journal of Gear Manufacturing, 1997.

Feldstein, Composite Electroless Plating, Chapter 11, Electroless Plating: Fundamentals and Applications, American Electroplaters and Surface Finishers Society, 1990.

Palumbo et al. Electrodeposited Nanocrystalline Coatings for Hard-Facing Applications, AESF SUR/FIN (R) Proceedings, p. 686, 2002 Proceedings.

Hamid et al. Development of electroless nickel-phosphorus composite deposits for wear resistance of 6061 aluminum alloy, Material Letters, 57, 2002, p. 720.

Wang et al. Scuffing and wear behavior of aluminum piston skirt coatings against aluminum cylinder bore, Wear, 225, 1999.

Bozzini et al. Relationships among crystallographic structure, mechanical properties and tribological behavior of electroless Ni-P (9%) B4C films, Wear, 1999 p. 225-229.

Bunshah, Handbook of Hard Coatings, Noyes 2001, p. 452.

IBM Technical Disclosure Bulletin, Low Porosity Plating Method for Sintered Powered Metals, vol. 38, No. 8, Aug. 1995, pp. 445-447.

* cited by examiner

PRECISION WIRE SAW INCLUDING SURFACE MODIFIED DIAMOND

CROSS REFERENCE TO RELATED APPLICATIONS

The instant application claims the benefit of U.S. Provisional Application Ser. No. 61/097,422 filed on Sep. 16, 2008 and U.S. Provisional Application Ser. No. 61/187,789 filed on Jun. 17, 2009 which are herein incorporated by reference in their entirety.

DETAILED DESCRIPTION

Definitions

In describing and claiming the present invention, the following terminology will be used in accordance with the definitions set forth below.

The term "abrasive", as used herein, refers to any material used to wear away softer material.

The term "wire", as used herein, refers to a cylindrical, elongated string of material. The material may be metal, composite materials, or a combination of metals and/or composite materials. Composite materials may include KEVLAR materials, carbon materials and combinations thereof. Wire may be a single strand or include multiple strands.

The term "exposure", as used herein, refers to:

Relative Exposure=$100(t_{c0}-t_{b0})/t_{c0}$

Space between cutting point and bond surface=$t c_0 - t b_0$

Where $tc_0$ is the initial height of the abrasive particle from the wire surface to the outermost tip of the particle that would be in contact with the workpiece and $tb_0$ is the initial average thickness of the bonding layer.

The term "chemical bond", as used herein, refers to a surface to which metallic or organic molecular groups have been chemically adsorbed.

The term "bond" or "bond matrix", as used herein, refers to the material that is used for attaching the abrasive particles to the wire. The attachment can be mechanical, chemical or a combination of both.

The term "coating", as used herein, refers to a material that envelops the abrasive particles either partially or entirely. The coating may be metallic, polymeric, vitreous or combinations of these by layer or by mixture.

The term "conventional diamond" as used herein, refers to any diamond not subject to the process taught in U.S. Provisional Application Ser. No. 61/097,422 and/or U.S. Provisional Application Ser. No. 61/187,789.

The term "surface roughness", as used herein, refers to the measurement of a two-dimensional image that quantifies the extent or degree of pits and spikes of an object's edges or boundaries as stated in the CLEMEX image analyzer, Clemex Vision User's Guide PE 3.5 ©2001. Surface roughness is determined by the ratio of the convex perimeter divided by the perimeter.

$$\text{Surface Roughness} = \frac{ConvexPerimeter}{Perimeter}$$

Note that as the degree of pits and spikes increases, the surface roughness factor decreases.

The term "sphericity", as used herein, refers to the estimate of the enclosed area of a two dimensional image or object ($4\pi A$) divided by the square of perimeter ($p^2$).

$$\text{Sphericity} = \frac{4\pi A}{p^2}$$

The term "surface area" as used herein, refers to the external surface of a particle. When used with a plurality of particles, i.e., powder, the term specific surface area is used and is reported as surface area per gram of powder.

It is important to note that although the terms defined above refer to measuring two-dimensional particle profiles using microscopic measuring techniques, it is understood that the features extend to the three-dimensional form. Automated image analysis of particle size and shape is recognized by one skilled in the art as a reliable, reproducible method of measuring particle characteristics. Although the CLEMEX image analyzer was used, similar devices are available that will reproduce the data.

Figure 1A:
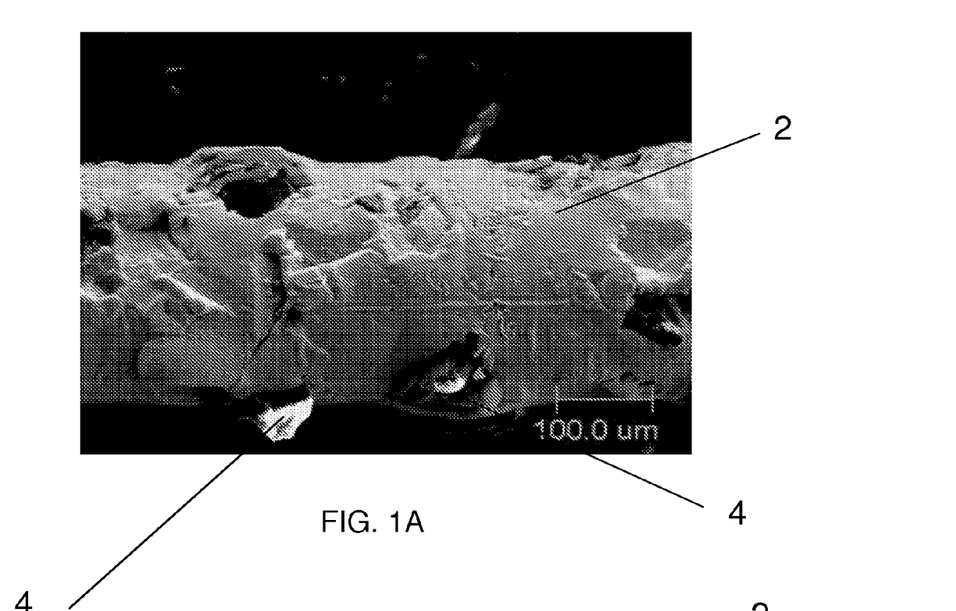
FIG. 1(a) is a scanning electron microscope (SEM) image of a conventional diamond coated wire.
Figure 1B:
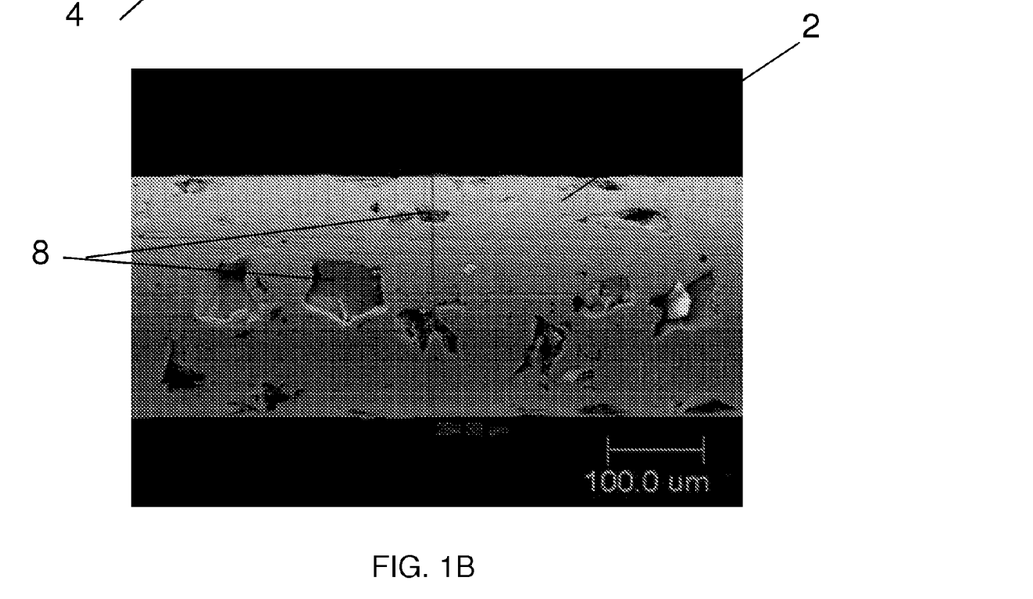
FIG. 1(b) is a scanning electron microscope (SEM) image of a conventional diamond coated wire after use.

There exists a need for a diamond particle that is resistant to pulling out of the bond matrix on a diamond coated wire. Further, there exists a need for diamond particles that will remain in the bond matrix for an extended time period compared to conventional diamond particles. Additionally, there exists a need to cut materials such as silicon ignot, more efficiently, at increased speeds. Comparative FIG. 1(a) shows a wire 2 containing conventional diamond particles 4 protruding from electroplated bond matrix 6. Comparative FIG. 1(b) shows the wire 2 after it has been used for cutting silicon. Note the absence of conventional diamond particles in the used wire and pock marks 8 where conventional diamond particles were pulled out.

When looking at conventional diamond coated wires, it is quite apparent that the conventional diamond particles are mechanically retained. In the case of an electroplated bond matrix as shown in comparative FIGS. 1(a) and 1(b), the electroplated nickel bond matrix does not chemically bond to the surfaces of the conventional diamond particles and, similarly, resin does not chemically bond with the carbon in the diamond.

Figure 2A:
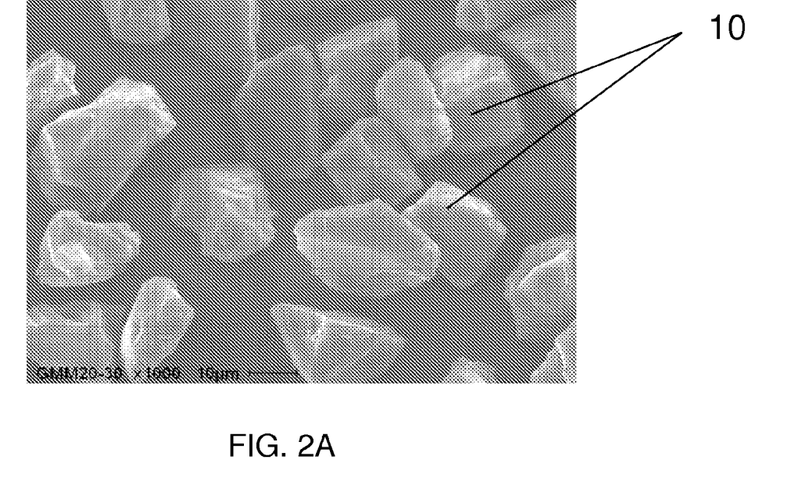
FIG. 2(a) is a scanning electron microscope (SEM) image of conventional diamond particles used in conventional diamond coated wires.
Figure 2B:
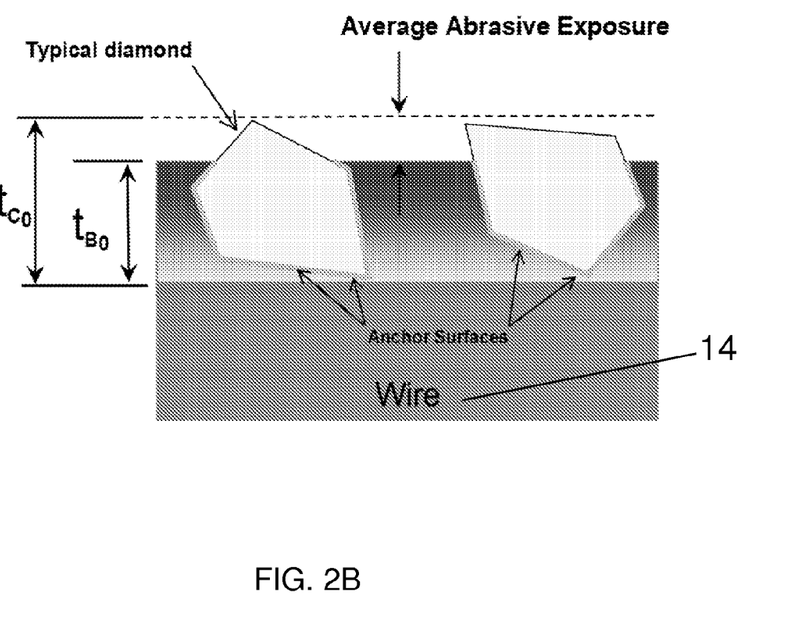
FIG. 2(b) illustrates conventional diamond particles in a conventional diamond coated wire.

Referring to comparative FIG. 2(a), the surfaces of conventional diamond particles are shown at 10. As shown in FIG. 2(a), the particles are relatively smooth as a result of fracture along crystal planes due to the milling and micronizing process used in manufacturing micron-sized diamond particles. Comparative FIG. 2(b) illustrates a wire 14 having a surface 16 including conventional diamond particles 18 bonded to the surface by a bond matrix 20. As depicted in FIG. 2(b), due to the relatively smooth surfaces 22 of conventional diamond particles 18, a significant thickness of bond matrix, at least as thick as half of a particle diameter, is necessary for sufficiently anchoring the conventional diamond particles 18 in the bond matrix 20. In this case, the exposure of the conventional diamond particles would be at least about 50% or less.

Figure 3A:
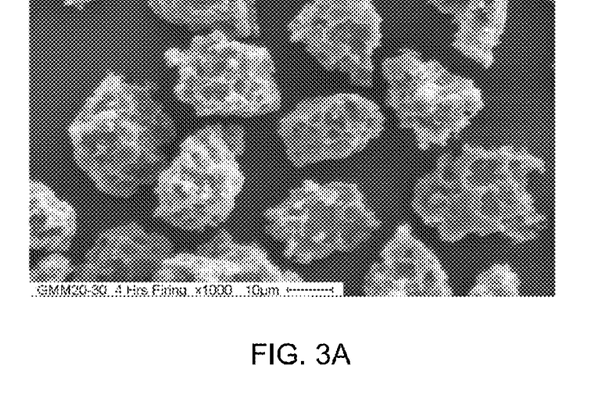
FIG. 3(a) is a scanning electron microscope (SEM) image of surface modified diamond particles.

In FIG. 3(a), surface modified diamond particles are shown at 12. The surface modified particles 12 in FIG. 3(a) have channels, inlets and pits which permit the bond matrix to penetrate and fill the channels, inlets and pits to provide a stronger mechanical anchor for the surface modified diamond particles in the bond matrix.

The surface modified diamond particles 12 may be used in a fixed abrasive wire having abrasives fixed thereon for use in cutting, slicing, internal grinding, dicing and ingot-cutting of such rigid materials as silicon, quartz, ceramics and the like.

The larger exposure provided by the surface modified diamond particles will provide for a better free cutting ability than wire containing conventional diamond particles and results in reduced heat generation at the cutting points. It is also expected that the increased area between the abrasive cutting points and the bond surface will provide a larger channel for cuttings and swarf removal and will be less erosive than wire containing conventional diamond particles.

The overall effect of using surface modified diamond particles that have a higher material removal rate than conventional diamond particles is that a lower concentration of diamond particles could be used on the wire. This, coupled with the ability of using less bond material to affix the diamond particles, will significantly reduce the cost of producing the wire.

It is also expected that by using surface modified diamond particles, less particles will be required to achieve the same amount of cutting/material removal as opposed to using conventional diamond particles.

Figure 3B:
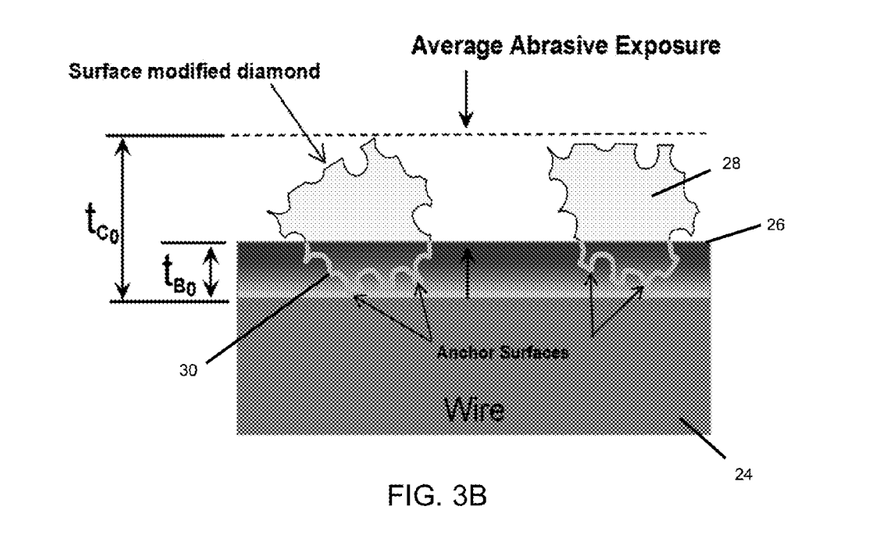
FIG. 3(b) illustrates surface modified diamond particles in a coated wire application.

FIG. 3(b) illustrates wire 24 having a surface 26 and surface modified diamond particles 28 bonded to surface 26 by bond matrix 30. Each surface modified diamond particle has a surface roughness of about 0.60 to about 0.80 and a sphericity of about 0.25 to about 0.50. As shown in FIG. 3(b), less bond matrix material is required as compared to FIG. 3(a). The advantages are further discussed below.

As the wire is used in a cutting application and swarf is generated, the bond layer will typically erode away at a rate faster than the diamond particles wear away. In the case of FIG. 3(a) above, as the bond material wears away, the exposure of the conventional diamond particles may increase to some extent, however, at some point, the particles will simply fall out of the bond material because there will not be sufficient amount of bond material for anchoring the particles.

Suitable wire materials include metals, alloys of metal, polymers (synthetic or natural), carbon, textiles, organic or inorganic fibers, silk and combinations thereof. In one embodiment, steel wire such as piano wire, may be used. Other alternatives include metal wires such as tungsten wire or molybdenum wire. In one embodiment, the wire includes a coating or bond matrix that is metal-plated, i.e., a nickel-plated bond matrix. Other alternative materials that may be used as a bond matrix include metallic materials, polymeric resins, hybrid systems (vitreous and polymer), electrolytic nickel coatings, electroless nickel coatings, braze-bond systems and resin-bond systems that may further include thermo-set resins and/or UV curable resins. Additionally, combinations of the above bond matrix materials may be used.

In addition to the bond matrix, in one embodiment, the wire may include additional coatings such as metals or resins. Such metals and resins and their combinations may be selected from those mentioned above.

The wire may have a length of between about 1 cm to about 1000 km or alternatively, about 200 km to about 600 km. In one embodiment the wire is in a continuous loop. The thickness of the wire may be between about 10 um to about 500 um or alternatively, about 50 um to about 200 um.

The superabrasives used in one embodiment of the present invention are the surface modified diamond particles taught in U.S. Provisional Application No. 61/097,422 and U.S. Provisional Application No. 61/187,789 both of which are hereby incorporated by reference in their entirety.

The abrasives used in/on the wire may be coated abrasives. Such coatings include, but are not limited to, metal coatings, metal alloy coatings and combinations thereof. Examples of such coatings include chromium, titanium, copper, molybdenum, nickel and tungsten, Some embodiments of the invention include, but are not limited to, the following:

A wire including surface modified diamond particles incorporated, at least partially, into a wire.

A wire including surface modified diamond particles and conventional diamond particles incorporated, at least partially, into a wire.

A wire including a surface having surface modified diamond particles incorporated into a surface on the wire. The surface modified diamond particles are bonded to the surface of the wire surface by a bond matrix.

A wire including a surface having surface modified diamond particles and conventional diamond particles incorporated, at least partially, into a surface on the wire. The surface modified diamond particles are bonded, at least partially, to the surface of the wire by a bond matrix.

Any method may be used to affix the abrasive particles to the wire or push the diamond at least partially into a wire. The fixed abrasive wire may be made by methods such as electroplating, physically pushing the diamond into the wire, laser conditioning, brazing, affixing the particles using a resin, and impregnating the diamond into the wire.

In an embodiment, electrochemical deposition may be used to deposit the abrasive directly onto the wire substrate. Electrochemical deposition generally calls for placing an electrically charged wire in a bed of abrasive particles in an oppositely charged liquid solution of a metal compound. As metal precipitates on the wire, it captures abrasive particles within a thin metal layer and thereby binds the abrasive to the wire. For example, U.S. Pat. No. 5,438,973 to Schmid et al., discloses diamond abrasive particles fixed in nickel plating to a cutting surface of a tear-drop cross section stainless steel wire core.

In an embodiment, the abrasive particles may also be affixed to a wire by a brazed metal bond, wherein the grains are disposed upon the surface of the wire with a preselected surface distribution as taught in U.S. Pat. No. 6,102,024.

In an embodiment, the abrasive particles may be affixed to a wire by a resin bond. An example of a suitable resin bond is taught in U.S. Pat. No. 6,463,921.

Figure 4A:
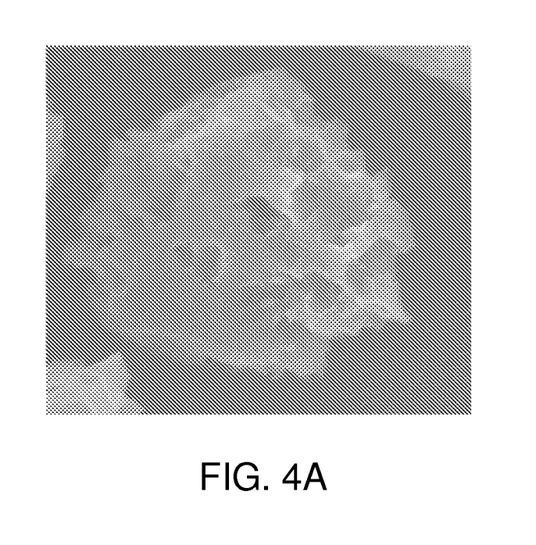
FIG. 4(a) is a scanning electron microscope (SEM) image of a conventional diamond particle.
Figure 4B:
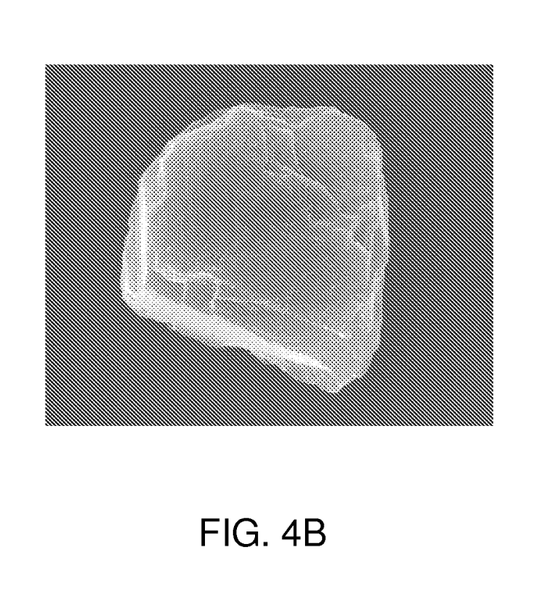
FIG. 4(b) is a scanning electron microscope (SEM) image of a surface modified diamond particle.

In addition to the improved bond strength and abrasive exposure, the use of surface modified diamond particles also provides for substantially more cutting points per particle than conventional diamond particles. As shown in FIG. 4(a), diamond particles produced using the modification process display 2 to 3 times the number of cutting points than conventional milled diamond particles as shown in FIG. 4(b). These additional cutting points provide each surface modified diamond particle with a much higher capacity for material removal than conventional monocrystalline diamond particles. Also, it has been demonstrated that the overall friability or toughness of the surface modified diamond particle is only reduced by a factor of 5 to 10 percent after the modification process. Therefore the effective life of the diamond particle within the tool will not be diminished.

As shown in FIG. 3(b) less bond matrix material is required than for the comparative example shown in FIG. 3(a). In FIG. 3(b), bond matrix material fills the pits and indentations of the surface modified diamond particles anchoring the particles in the bond matrix material. As a result, less bond matrix material is required. Using less bond matrix material provides for a greater distances between the exposed tip of the diamond particle and the surface of the bond matrix. This distance will allow for more particle exposure and also allows more space for the swarf and coolant to pass between the workpiece and the wire.

Since the extreme roughness of the surface modified diamond particles provide substantially more anchoring sites than conventional monocrystalline diamond particles, it is apparent that a lower level of bond matrix would be required to provide a superior bond of the surface modified diamond particles to the wire.

The fixed abrasive wire may be used to cut any materials. Common substrate materials include silicon, sapphire, silicon carbide, aluminum nitride, tellurium, silica, gallium arsenide, indium phosphide, cadmium sulfide, germanium, zinc sulfide, gray tin, selenium, boron, silver iodide, and indium antimonide, among other materials.

One embodiment includes a method for cutting a substrate, comprising the steps of: providing a wire saw that includes a cutting wire including surface modified diamond particles; applying a coolant or lubricant to the cutting wire; contacting a surface of the substrate with the cutting wire; and manipulating the relative positioning of the cutting wire and the surface consistent with a cutting action.

In one embodiment, a wire including the surface modified diamond particles and a coolant or lubricant fluid may be used. The coolant or lubricant fluid can be aqueous or non-aqueous. Suitable fluids include water and alkylene glycols. Alkylene glycols used in the context of the present invention include ethylene glycol (EG), polyethylene glycol (PEG), and polypropylene glycol (PPG).

In an embodiment, the bond matrix may additionally include additives selected from the group of abrasives, i.e., materials having a Mohs hardness of greater than seven or an absolute hardness of greater than about 100 and superabrasives having a hardness on the Knoop scale in excess of about 3,000 kg/mm$^2$. A comparison of Knoop and Mohs hardness values for conversion purposes is available in standard handbooks.

Other additives to the bond matrix may include polymeric fibers, inorganic fibers, lubricants, curing agents, fillers, porosity agents, metals and combinations thereof may be used.

In an embodiment the wire may contain functionalized diamond particles such as those taught in U.S. Pat. No. 6,372,002 which is hereby incorporated by reference in its entirety. The functionalized diamond particles may be present on a wire with surface modified diamond particles. Optionally, the surface modified diamond particles may be subjected to the functionalizing process as taught by U.S. Pat. No. 6,372,002.

EXAMPLES

Example 1

Steel wires were coated with nominal 20-30 micron mean size diamond particles using the following procedure.

Bath Preparation:
1. To a 2 liter glass beaker, the following was added:
    a. 60 ml Niklad AR767 (nickel sulfate solution) sold by MacDermind Co. Denver, Colo.
    b. 800 ml de-ionized water
2. The beaker was placed on a hot plate and the solution heated to 70° C.
3. When solution reached 70° C., 150 ml of Niklad B (sodium hypophosphite) solution was added.
4. When the bath was heated to the desired temperature of 85-90° C., it was held at that temperature to prepare wire for coating.

Wire Cleaning:
1. Several pieces of 0.150 mm diameter high carbon steel (C1085 steel) wire were cut to lengths of about 3 feet.
2. The group of wires was weighed and the weight was recorded to determine the weight % of the composite coating (nickel+diamond).
3. The wires were placed into a 1 liter beaker containing 250 ml HCL and 250 ml de-ionized water
4. The wires soaked in the acid/de-ionized water solution for approximately 5 min (to minimize weight loss) until acid solution turned yellow.

The "cleaned" wires were quickly removed from the beaker and rinsed with de-ionized water and placed into the hot nickel bath solution.

Coating Process:
1. When placed into the nickel solution beaker, the wire coil expanded on the bottom of the beaker.
2. 20 grams of GMM 20-30 micron conventioanl synthetic industrial diamond powder manufactured by Diamond Innovatios, Worthington, Ohio was added to the bath and the coating start time was recorded.
3. Every 5 minutes, the solution was manually stirred with a glass rod to get the diamond suspended up into bath and away from the wire. After a brief stirring, the diamond was allowed to settle back onto the wire.
4. Every 15 minutes, 6 ml of Niklad 767AR and 6 ml Niklad 767 HpH (sodium hypophosphite solution) were added to replenish the bath.
5. The coating process was continued for a total of 3 hours.
6. After three hours, the wire was removed from the bath and the hot plate was turned off.
7. The coated wires were rinsed with de-ionized water, dried and weighed and recorded to determine the weight % of the composite coating (nickel+diamond).

Several lengths of wire were then coated using 20-30 um surface modified diamond following the same procedure as above.

Figure 5A:
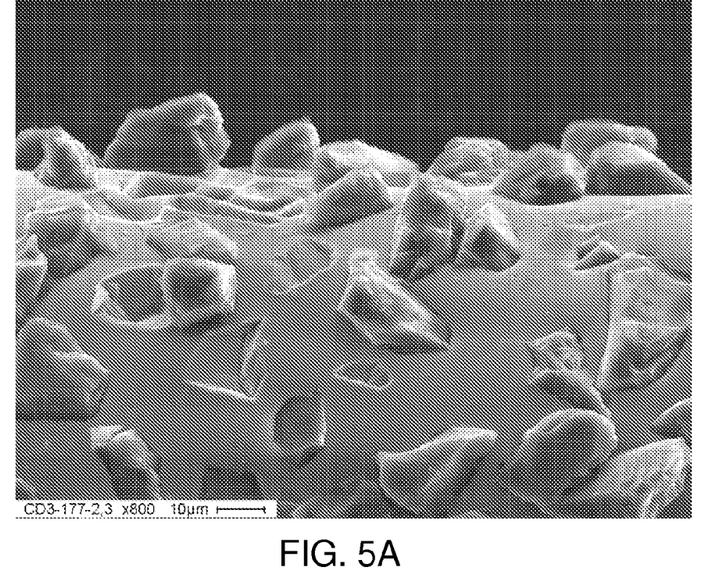
FIG. 5(a) is a scanning electron microscope (SEM) image of a wire containing conventional diamond particles made according to Example 1.
Figure 5B:
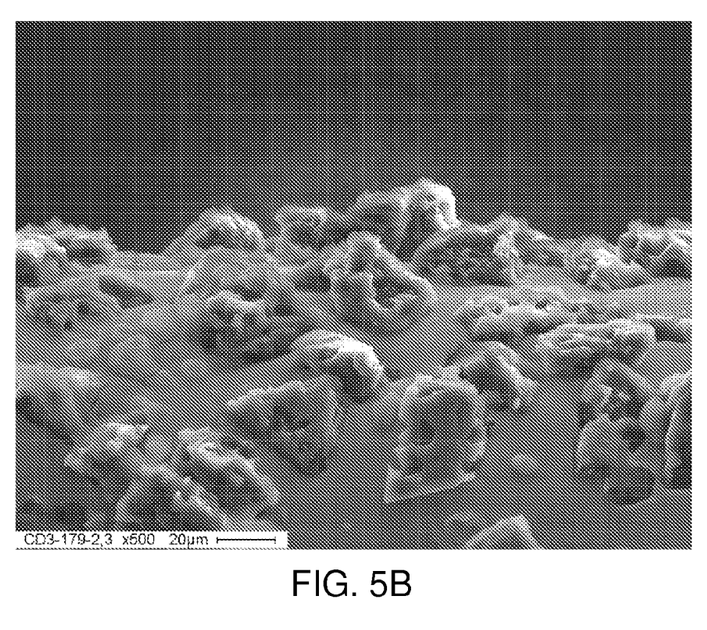
FIG. 5(b) is a scanning electron microscope (SEM) image of a wire containing surface modified diamond particles made according to Example 1.

Scanning electron microscope images were taken of sections of each wire. FIG. 5(a) shows the coated wire made with conventional 20-30 micron diamond particles and FIG. 5(b) shows the coated wire made with surface modified 20-30 micron diamond particles. As can be seen in FIG. 5(a), the conventional diamond particles appear to range from fully embedded within the nickel matrix to just touching the surface of the nickel. The conventional diamond particles appear to be uniformly distributed over the surface of the wire. On average, there appears to be a relatively large number of conventional diamond particles protruding from the surface of the wire where at least 50% of the conventional diamond particles are exposed from the nickel coating.

FIG. 5(b) also shows good coverage of the surface modified diamond particles over the wire surface and good protrusion of the surface modified diamond particles from the wire surface. The surface modified diamond particles are distinctly different from the conventional diamond particles of FIG. 5(a). FIG. 5(b) clearly shows that the nickel penetrates into the pore spaces, pits and voids of the surface modified diamond particles. It can also be seen from FIG. 5(b) that there are additional cutting points associated with each of the surface modified diamond particles as compared to the conventional diamond particles.

Example 2

A simple sawing test was performed using a) a wire containing the conventional 20-30 um diamond particles; and b) a wire containing surface modified 20-30 um diamond particles. Each wire was secured into a hand saw and used to cut a polysilicon block.

The test included the following steps:
1.) One strand of approximately 16 inches of wire were obtained for each type of diamond (a) and b)).
2.) One end of wire a) was looped around a loosened bolt on one end of a hand saw and tightened.
3.) The other end of the wire a) was looped around another loosened bolt, drawn tight and the bolt was tightened.
4.) The wire was further tightened by turning an adjustment screw on the top of the saw. The wire a) was adjusted to a tension such that approx 1-2 mm of deflection was observed when the saw was held against the silicon block.
5.) After the wire a) was secured into the saw, the wire was placed against a ½ inch×2 inch×3 inch block of polysilicon that was held in a vice. A notch was made on the corner of the block by dragging the wire against the corner. When the notch was established, a few drops of water were placed onto this area to act as a coolant.
6.) A cut was made into the polysilicon block by advancing and retracting the saw using a stroke of approx 8 inches. Only the weight of the saw was used as a downforce.
7.) Cutting was continued with occasional additions of water until 100 strokes were completed.
8.) After the test was completed, wire a) was rinsed with water and a small section in the middle of the saw was removed for SEM analysis.
9.) This test was repeated using the above steps for wire b).

Figure 5C:
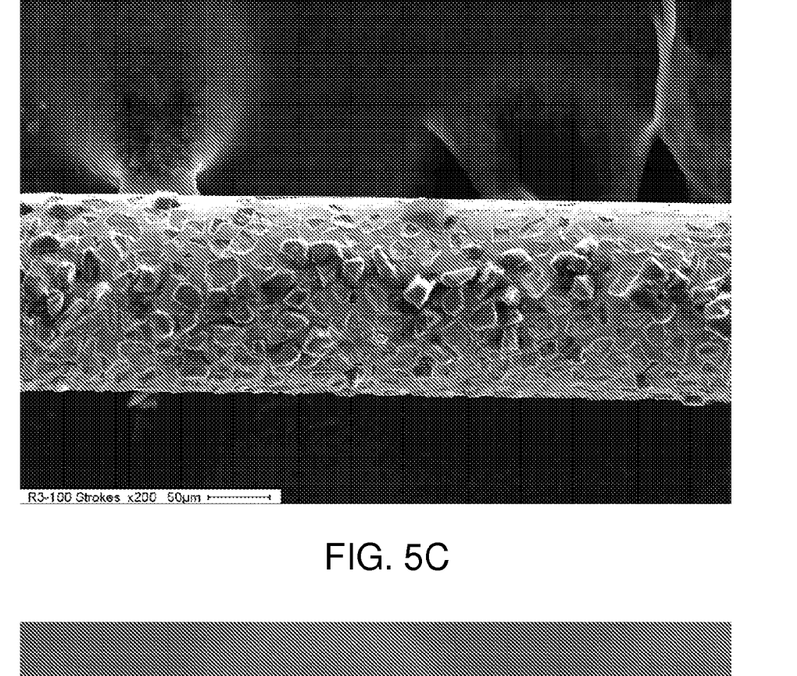
FIG. 5(c) is a scanning electron microscope (SEM) image of a wire containing conventional diamond particles made according to Example 1 after use.
Figure 5D:
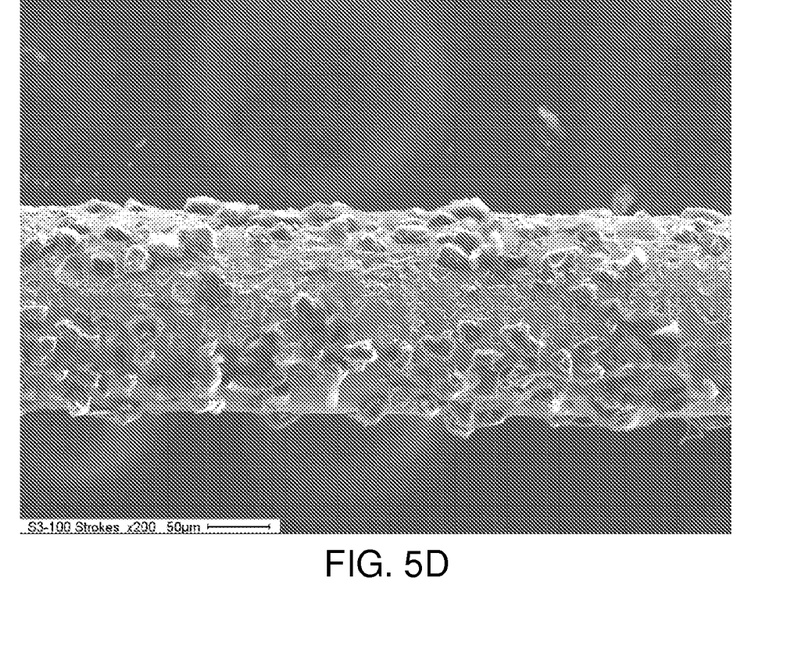
FIG. 5(d) is a scanning electron microscope (SEM) image of a wire containing surface modified diamond particles made according to Example 1 after use.

As can be seen from scanning electron photographs of the tested of the wires in FIGS. 5(c) and 5(d), the contact side of both wires is clearly seen where the wire was abrading against the polysilicon block. FIG. 5(c) shows that there is virtually no diamond left on the wire that used the conventional milled 20-30 um diamond particles. It is also clear that many of the particles on the sides of the wire have been pulled out of the metal bond. FIG. 5(d) shows that there are still diamond particles remaining on the working side of the wire that was against the polysilicon. Also, although some of the surface modified diamond particles have pulled out of the bond matrix, many more are still embedded within the matrix than with the regular diamond wire.

Equivalents

Although the invention has been described in connection with certain exemplary embodiments, it will be evident to those of ordinary skill in the art that many alternatives, modifications, and variations may be made to the disclosed invention in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein explicitly described, embodiments incorporating the claimed invention but more closely adapted for an intended use or performance requirements. Accordingly, it is intended that all such alternatives, modifications and variations that fall within the spirit of the invention are encompassed within the scope of the appended claims.

The invention claimed is:

1. A wire comprising:
a surface; and
surface modified diamond particles bonded to said surface by a bond matrix, wherein each diamond particle has a surface roughness of about 0.60 to about 0.80 and a sphericity of about 0.25 to about 0.50.

2. The wire of claim 1, wherein said wire comprises a material selected from the group of metals, polymers (synthetic or natural), carbon, and alloys of metals, textiles, organic or inorganic fibers, silk and combinations thereof.

3. The wire of claim 2, wherein said metal is selected from the group of iron, steel, stainless steel, nickel and/or alloys and combinations thereof.

4. The wire of claim 1, wherein said bond matrix is selected from the group of metallic materials, polymeric resins, hybrid systems (vitreous+polymer) and combinations thereof.

5. The wire of claim 1, wherein the length of said wire is between about 1 cm to about 1000 km.

6. The wire of claim 5, wherein the length of said wire is between about 200 cm to about 600 km.

7. The wire of claim 1, wherein said wire is a continuous loop.

8. The wire of claim 1, wherein said wire has a diameter or thickness of between about 10 um and about 500 um.

9. The wire of claim 8, wherein said wire has a diameter or thickness of between about 50 and about 200 um.

10. The wire of claim 1, further comprising a coating.

11. The wire of claim 1, wherein said diamond particles further comprise a coating.

12. The wire of claim 11, wherein said coating is metal or resin.

13. The wire of claim 1, wherein the average exposure of said diamond particles is at least about 20%.

14. The wire of claim 13, wherein the average exposure of said diamond particles is between about 30% to about 60%.

15. The wire of claim 1, further comprising additives in said bond matrix selected from the group of abrasives superabrasives, surface functionalized diamond particles, polymeric fibers, inorganic fibers, lubricants, curing agents, fillers, porosity agents, metals and alloys of metals, and combinations thereof.

16. A wire comprising:

surface modified diamond particles incorporated into said wire;

wherein each diamond particle has surface roughness about 0.60 to about 0.80 and a sphericity of about 0.25 to about 0.50.

17. A wire comprising:

diamond particles incorporated into said wire; and diamond particles bonded to said surface by a bond matrix, wherein each diamond particle has surface roughness of about 0.60 to about 0.80 and a sphericity of about 0.25 to about 0.50.

18. A method of fabricating a wire comprising superabrasive particles comprising the steps:

providing a wire;

cleaning said wire;

coating said wire with superabrasive particles having a surface roughness of about 0.60 to about 0.80 and a sphericity of about 0.25 to about 0.50.

19. An apparatus for cutting comprising:

a first means for cutting an object, wherein said first means has a surface roughness of about 0.60 to about 0.80 and a sphericity of about 0.25 to about 0.50;

a second means for retaining said first means; and a third means for supporting said second and first means.

20. A method for cutting a material comprising the steps of:

providing a wire comprising a surface and diamond particles bonded to said surface by a bond matrix, wherein each diamond particle has surface roughness of about 0.60 to about 0.80 and a sphericity of about 0.25 to about 0.50;

cutting through the surface of said material by dragging the wire through the material;

indexing the wire or object such that the wire is continuously cutting through said material forming a cutting zone;

providing a coolant and/or lubricant into said cutting zone while said wire is cutting said material.

21. The method of claim 20, wherein the cutting speed of the wire is about 0.1 m per second to about 20 m per second.

* * * * *